S. ARNOLD.
ARTIFICIAL FISH BAIT.
APPLICATION FILED SEPT. 27, 1917.
1,272,183.
Patented July 9, 1918.
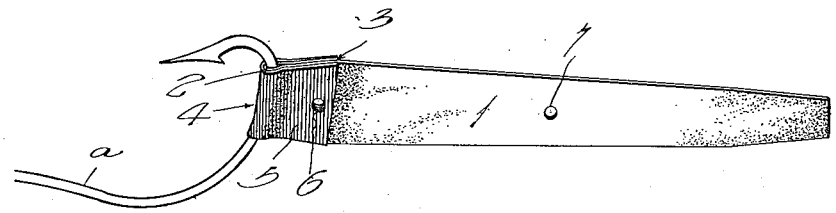
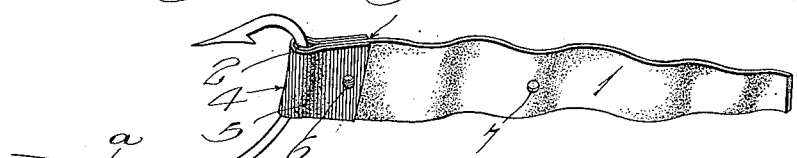
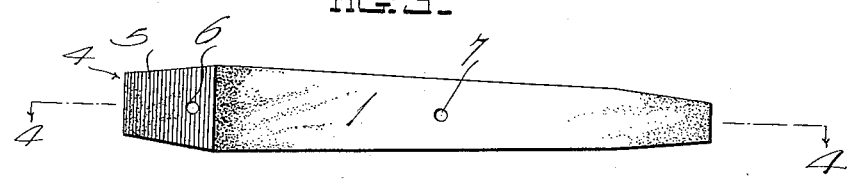
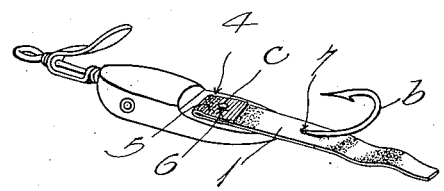
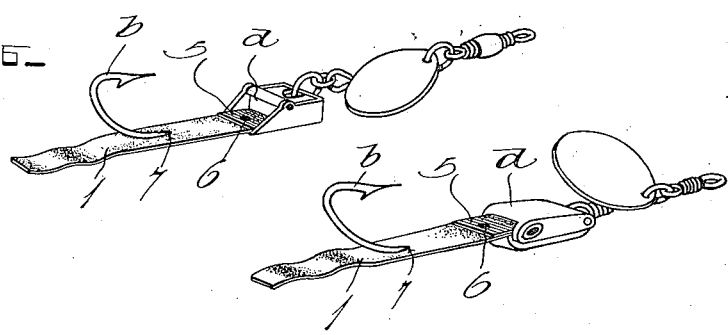
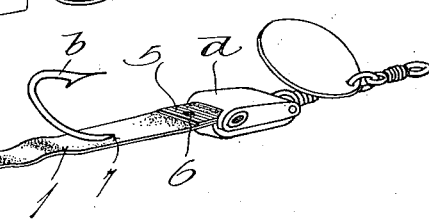
Witness
H. Woodard
Inventor
S. Arnold
By H. B. Willson & Co
Attorneys

UNITED STATES PATENT OFFICE.

SIGEL ARNOLD, OF KANSAS CITY, MISSOURI.

ARTIFICIAL FISH-BAIT.

1,272,183.            Specification of Letters Patent.      Patented July 9, 1918.

Application filed September 27, 1917. Serial No. 193,544.

*To all whom it may concern:*

Be it known that I, SIGEL ARNOLD, a citizen of the United States, residing at Kansas City, in the county of Jackson and State of Missouri, have invented certain new and useful Improvements in Artificial Fish-Bait; and do declare the following to be a full, clear, and exact description of the invention, such as will enable others skilled in the art to which it appertains to make and use the same.

This invention relates to certain new and useful improvements in artificial bait for fishing.

The principal object of the invention is to provide an artificial fish bait and which is an imitation of the well known pork rind bait which may be used as a bait for casting or for trolling.

Another object of the invention is to provide an artificial bait which is flexible so that when it is moved through the water or moved by the water, the bait will wiggle so as to give the appearance of a live minnow.

Another object of the invention is to provide for pivotally connecting the bait to the hook in such manner that the wiggling effect of the bait may be increased to the maximum so as to render the bait more animated and thus increase its effectiveness.

Another object is to provide for connecting the bait to the hook in such manner that the hook will not sufficiently increase the size of the opening, through which it passes, to cause the disengagement of the bait from the hook.

A further object of the invention is to provide an artificial bait for fishing which may be used over and over again and which may be easily cleaned when soiled.

With these and other objects in view, the invention consists of certain novel features of construction, and the combination and arrangement of parts as will be hereinafter fully described and claimed.

In the accompanying drawings wherein the preferred form of the invention is shown and wherein similar reference characters designate corresponding parts throughout the several views;

Figure 1 is a perspective view of a device constructed in accordance with this invention showing one manner in which it is used.

Fig. 2 is a similar view illustrating the wave like appearance which the device presents when it is pulled through the water.

Fig. 3 is a side elevation of a device.

Fig. 4 is a longitudinal sectional view taken on the plane indicated by the line 4—4 of Fig. 3 and Figs. 5, 6 and 7 are perspective views of different forms of fishing tackle illustrating the manner in which the bait is used in connection with the same.

Referring more particularly to the drawings, the numeral 1 designates a strip of flexible material such as rubber, said strip being slightly less in width at its rear end than at its forward end. The forward end of the strip 1 is doubled upon itself as at 2 and cemented as at 3 so as to form a loop or eye 4. Cemented to the outer side of the loop 4 is another piece of rubber 5 which not only constitutes a reinforcement, but also somewhat resembles the head of a minnow, while the ends thereof somewhat resemble the gills of a minnow, which adds to the illusory effect of the bait. Extending through the head formed by the double portion of the strip 1 and the strip 5 is an opening 6 while extending through the intermediate portion of the strip 1 is another opening 7. The strip 1 is preferably made of pure white rubber, while the piece 5 may also be made of the same material, but preferably of red or other colored rubber to form an imitation of the well known pork rind bait. The device may be used in various ways. In Figs. 1 and 2 of the drawings an ordinary fish hook *a* is shown extending through the loop 4, while in Figs. 5, 6 and 7 the device is shown used in connection with certain forms of fishing tackle in connection with which the usual pork rind bait is used. When used as in Fig. 1, the hook constitutes a pivot, and the bearing of this pivot extends from edge to edge of the short strip 5. It will be seen, therefore, that this not only provides a very strong fastening means, but also provides a pivotal connection, in which the hook is the pivot, so that the wiggling effect of the bait is greatly facilitated. The hooks *b* of this device are extended through the openings 7 in the intermediate portion of the strips 1, while the head with the strip is attached to the body portions of the devices in various ways. In Fig. 5 a knob or headed pin *c* is extended through the opening 6 in the head of the strip while in Figs. 6 and 7 the head of the strip is held by small clasps *d*. When the device is attached to fishing tackle in the manner above described, and pulled through the water, it will wiggle in such a manner as to represent the action of a live minnow. It is readily and easily connected to the fishing tackle, and should it become soiled it may be readily cleaned.

From the foregoing description, taken in connection with the accompanying drawings, it will be seen that the objects of the invention have been effectively carried out.

In view of the fact that certain changes in form, proportion, and in the minor details of construction may be resorted to without departing from the spirit of this invention, it is to be understood that I do not wish to be limited to the construction herein shown and described other than as claimed.

I claim:—

1. An artificial fish bait comprising a flat strip of flexible material, and a short strip of material folded upon one end of the first said strip and forming a loop that extends from one longitudinal edge to the other longitudinal edge of the strip and adapted to have a fish hook extended therethrough.

2. A device of the class described comprising a strip of flexible material having one end doubled upon itself and cemented to form a loop, and a short strip of flexible material cemented to the outer side of said loop to form a head.

In testimony whereof I have hereunto set my hand in the presence of two subscribing witnesses.

SIGEL ARNOLD.

Witnesses:
E. J. YERIAN,
A. L. MOREHEAD.